United States Patent
Carey

(10) Patent No.: US 6,324,623 B1
(45) Date of Patent: Nov. 27, 2001

(54) COMPUTING SYSTEM FOR IMPLEMENTING A SHARED CACHE

(75) Inventor: James E. Carey, Brookline, MA (US)

(73) Assignee: Oracle Corporation, Redwood Shores, CA (US)

( * ) Notice: Subject to any disclaimer, the term of this patent is extended or adjusted under 35 U.S.C. 154(b) by 0 days.

(21) Appl. No.: 08/866,619

(22) Filed: May 30, 1997

(51) Int. Cl.[7] .................................................. G06F 12/06

(52) U.S. Cl. ........................................ 711/148; 711/137

(58) Field of Search .................................. 711/118, 141, 711/147, 148, 156, 153, 173, 205, 206, 209, 135

(56) References Cited

U.S. PATENT DOCUMENTS

| | | | |
|---|---|---|---|
| 4,975,833 | 12/1990 | Jinzaki | 364/200 |
| 5,179,702 | 1/1993 | Spix et al. | 395/364 |
| 5,274,789 * | 12/1993 | Costa et al. | 711/206 |
| 5,297,269 | 3/1994 | Donaldson et al. | 395/425 |
| 5,345,588 * | 9/1994 | Greenwood et al. | 709/107 |
| 5,394,555 | 2/1995 | Hunter et al. | 395/800 |
| 5,414,840 | 5/1995 | Rengarajan et al. | 395/600 |
| 5,430,850 * | 7/1995 | Papadopoulos et al. | 709/303 |
| 5,459,862 | 10/1995 | Garliepp et al. | 395/600 |
| 5,475,858 * | 12/1995 | Gupta et al. | 711/149 |
| 5,535,116 | 7/1996 | Gupta et al. | 364/134 |
| 5,566,315 | 10/1996 | Milillo et al. | 395/440 |
| 5,590,326 * | 12/1996 | Manabe | 711/150 |
| 5,613,086 | 3/1997 | Frey et al. | 395/479 |
| 5,636,355 | 6/1997 | Ramakrishnan et al. | 395/440 |
| 5,642,495 * | 6/1997 | Ammann et al. | 711/153 |
| 5,684,993 * | 11/1997 | Willman et al. | 711/207 |
| 5,742,785 * | 4/1998 | Stone et al. | 711/147 |
| 5,761,670 | 6/1998 | Joy | 707/103 |
| 5,778,429 * | 7/1998 | Sukegawa et al. | 711/129 |
| 5,788,429 | 7/1998 | Sukegawa et al. | 711/129 |

(List continued on next page.)

FOREIGN PATENT DOCUMENTS

WO 95/25306   9/1995   (WO) .

OTHER PUBLICATIONS

An Evaluation of Cache Coherence Protocols for MIN—Based Multiprocessors, Sandra Johnson Baylor et al., International Symposium on Shared memory Multiprocessing, pp. 230–241, Apr. 1991.*

Li, K., "Shared Virtual Memory on Loosely Coupled Multiprocessors," YALEU/DCS/RR—492, Yale University, Department of Computer Science, pp. 1–209, (Sep.1986).

Berson, A., *Client/Server Architecture*, Second Edition, McGraw–Hill Series on Computer Communications, (1996). Chapter 4, "Server Specialization in the Client/Server Environment," pp. 99–131. Chapter 16, "Technology and Advanced Applications of Data Warehousing," pp. 463–501.

Primary Examiner—Matthew Kim
Assistant Examiner—Pierre-Michel Bataille
(74) Attorney, Agent, or Firm—Hamilton, Brook, Smith and Reynolds, P.C.

(57) ABSTRACT

In a multi-threaded computing environment, a shared cache system reduces the amount of redundant information stored in memory. A cache memory area provides both global readable data and private writable data to processing threads. A particular processing thread accesses data by first checking its private views of modified data and then its global views of read-only data. Uncached data is read into a cache buffer for global access. If write access is required by the processing thread, the data is copied into a new cache buffer, which is assigned to the processing thread's private view. The particular shared cache system supports generational views of data. The system is particularly useful in on-line analytical processing of multi-dimensional databases.

64 Claims, 10 Drawing Sheets

U.S. PATENT DOCUMENTS

| | | | |
|---|---|---|---|
| 5,812,852 | * | 9/1998 | Poulsen et al. ............................ 717/6 |
| 5,822,763 | * | 10/1998 | Baylor et al. ......................... 711/141 |
| 5,829,034 | * | 10/1998 | Hagersten et al. .................... 711/141 |
| 5,860,101 | * | 1/1999 | Arimilli et al. ....................... 711/209 |
| 5,924,093 | * | 7/1999 | Potter et al. .............................. 707/7 |
| 5,950,228 | * | 9/1999 | Scales et al. ......................... 711/148 |
| 5,958,028 | * | 9/1999 | Bean et al. .............................. 710/62 |
| 6,026,474 | * | 2/2000 | Carter et al. ......................... 711/202 |
| 6,163,806 | * | 12/2000 | Viswanathan et al. ............... 709/229 |
| 6,167,490 | * | 12/2000 | Levy et al. ............................ 711/148 |

* cited by examiner

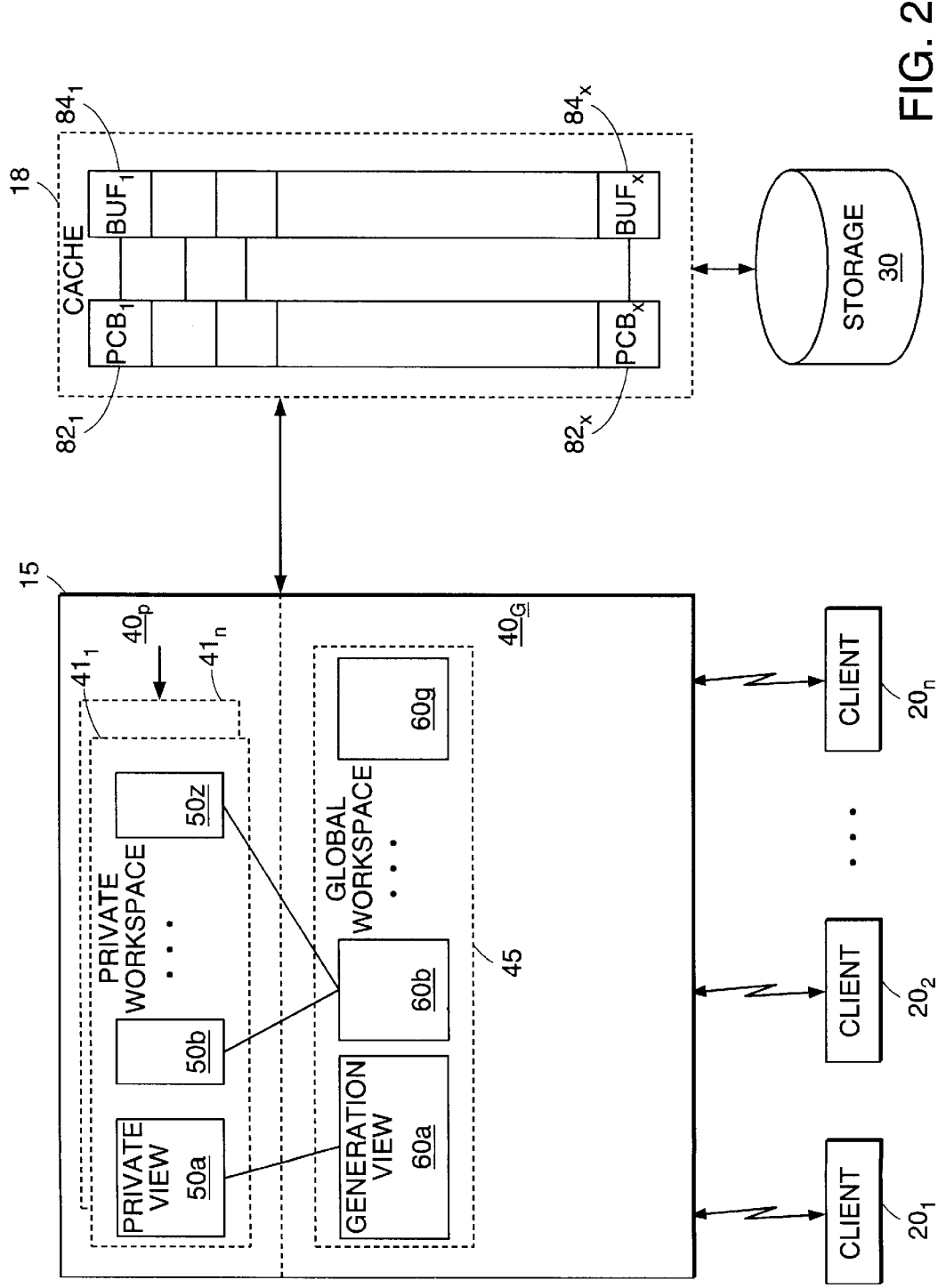

US 6,324,623 B1

COMPUTING SYSTEM FOR IMPLEMENTING A SHARED CACHE

BACKGROUND

In a large scale computer system, such as a database management system (DBMS), it is important to be able to support a number of different users concurrently. Without such a capability, the system would be little more than a standalone computer. To implement multi-user support, several different processing models have been utilized. One model that has been used is the multi-processing model. In multi-processing, each time a new user requests access to the system, a separate process is started. This process is in essence a separate execution of the software. Once started, the process services all of the requests from the user that spawned it. Under the multi-processing model, each process has its own separate memory space for use in storing and processing data.

Multi-processing is effective for supporting multiple users concurrently; however, it has severe scalability limitations. This is due mainly to two factors. First, spawning and maintaining a process involves a significant amount of overhead. Because of the high cost, only a small number of processes can be maintained at any one time. Second, the same set of data, used by multiple processes, may be stored redundantly; once in each process+ memory space. This redundancy can waste a significant amount of system resources.

To overcome some of the limitations of multi-processing, the multi-thread model was developed. According to the multi-thread model, there is only one execution of the software. That is, only one process is spawned. From this one process, multiple threads can be spawned to perform the work necessary to service user requests.

Multi-threading has several advantages over multi-processing. First, because only one process is spawned, overhead is kept to a minimum. It is true that each thread carries with it some overhead cost, but this cost is negligible when compared with the cost of maintaining an entire process. Because multi-threading significantly reduces system overhead, many more users can be supported. Another advantage of multi-threading is that it minimizes the redundant storage of data. Because all of the threads are part of the same process, all of the threads can share the same memory space. This in turn makes it easier to implement a shared cache.

With a shared cache, it is only necessary to store a set of data once. After the data is cached, all of the threads can access it. By reducing redundant storage of data, multi-threading makes more efficient use of system resources.

Implementing a shared cache gives rise to increased efficiencies. However, a shared cache is not without its disadvantages. One of the drawbacks of a shared cache is that it can be difficult to render a set of data in the cache visible to only one user (i.e. to make the entry "private" to the user). As noted above, once an entry is stored in the shared cache, that entry is accessible to all threads. In certain applications, it is important to be able to make a cache entry private to a single user. One application in which this ability is important is in on-line analytical processing (OLAP).

An OLAP system is typically used to provide decision support services, such as forecasting, financial modeling, and what-if analysis. In performing what if analysis, an OLAP system typically performs at least three operations: (1) it retrieves historical data from a databases; (2) it changes the data in accordance with a what-if scenario posed by the user; and (3) based on the changed data, it determines what other data is changed. What-if analysis is a powerful tool because it allows a user to forecast how a change in one area may affect another. For example, a user may use what-if analysis to predict how sales in a region may change if the sales force is increased by ten percent.

As noted above, one of the operations performed in a what-if analysis is to change the retrieved historical data. This change typically is not an actual change but a proposed "what-if" change. Because it is not an actual change to the data in the database, only the user making the change should see it. All other users should still see the original data. In such a situation, there is a need to make the proposed change private to the user making the change. In a typical shared cache, however, the only mechanism for making a cache entry private is to employ locks, which typically require additional overhead and can result in deadlocking between threads competing for the resource. Hence, there exists a need for a mechanism that can support private data without hindering performance.

SUMMARY OF THE INVENTION

In accordance with a preferred embodiment of the invention, a public memory structure is utilized to store data which is sharable between a plurality of users in a multi-threaded computing environment. In contrast to the prior art, a cache memory area on a server is used to store public, sharable data and private, non-sharable data without using locks to negotiate resource ownership. Consequently, there are public and private pages stored in global memory. The private pages are those that are modifiable by a user and the public pages are those that are only readable by one or more users.

One aspect of the invention is to manage memory on a computer. From the memory there are a plurality of cache memory blocks cooperatively shared by processing threads executing on the computer. These processing threads include user sessions and resource managers.

The user threads consume page data stored on the cache memory blocks. Each user thread has a public view of unmodified cached pager and can have modified cached pages in a private view. During on-line analytical processing (OLAP), the user threads process the cached pages. For pages that are only read by the user thread, the public view is used to access the necessary cache memory block, which may be read by multiple users. When an analysis requires modifying data, however, access through a public view is inappropriate. Instead, the cache memory block pointed to by the public view is copied to a new cache memory block. The user thread is then assigned a private pointer to the copied pages, and can modify the data in this private view without affecting data viewed by other threads.

The resource managers ensure that the user threads cooperate to function effectively. In particular, a paging manager interfaces the user threads with the cache memory space to retrieve pages from disk.

In accordance with a preferred embodiment of the invention, a computer-implemented program manages memory in a computer having a plurality of memory blocks. These memory blocks are preferably a cache memory area. Data is stored in memory blocks, including a first memory block and a second memory block. First and second user sessions or user threads execute in the computer, with the first user session having a global view of the first memory block data and the second user session having a global view of the first memory block data and a private view of the second memory block data. In a particular, the first and second user sessions are threads in a multi-threaded computer system.

The user threads preferably execute resource manager instructions to map data stored in a cache memory block with a location of the cache memory block in the computer. The resource manager also transfers data from a database into a cache memory block and stores generational views of the data. Preferably, the data is retrieved from a multi-dimensional database.

A particular method facilitates simultaneous analysis of data in multiple sessions in a computer. First, data is retrieved from storage into public blocks of a shared memory space. These public blocks store data for global read access by a plurality of user sessions. Second, public blocks of data are selectively copied into private blocks of the shared memory space. Each private block stores data for private read and write access by a single user session. Upon read access to a data item by a user session, the data item is read if present from a private block accessible by the user session. If the data item is not present on a private block accessible by the user session, the data item is read from a public block. Upon write access to a data item by the user session, the data item is written to a private block if present in a private block accessible by the user session. If the private block is not already present, then data is copied from a public to a private block for access by the user session.

Preferably, the user sessions and resource managers are implemented as processing threads in a multi-threaded computing system. In particular, the computing system can include a plurality of processing units for executing the threads. However, aspects of the invention can also be applied to processes in a multi-process architecture. As such, the term data accessor will be understood to encompass any computing mechanism to access or manipulate data, including threads and processes.

The above and other features of the invention, including various novel details of construction and combination of parts, will now be more particularly described with reference to the accompanying drawings and pointed out in the claims. It will be understood that the particular computing system for implementing a shared cache embodying the invention is shown by way of illustration only and not as a limitation of the invention. The principles and features of this invention may be embodied in varied and numerous embodiments without departing from the scope of the invention.

BRIEF DESCRIPTION OF THE DRAWINGS

FIG. 2 is a schematic block diagram of a preferred page management system.

DETAILED DESCRIPTION OF PREFERRED EMBODIMENTS OF THE INVENTION

Figure 1:
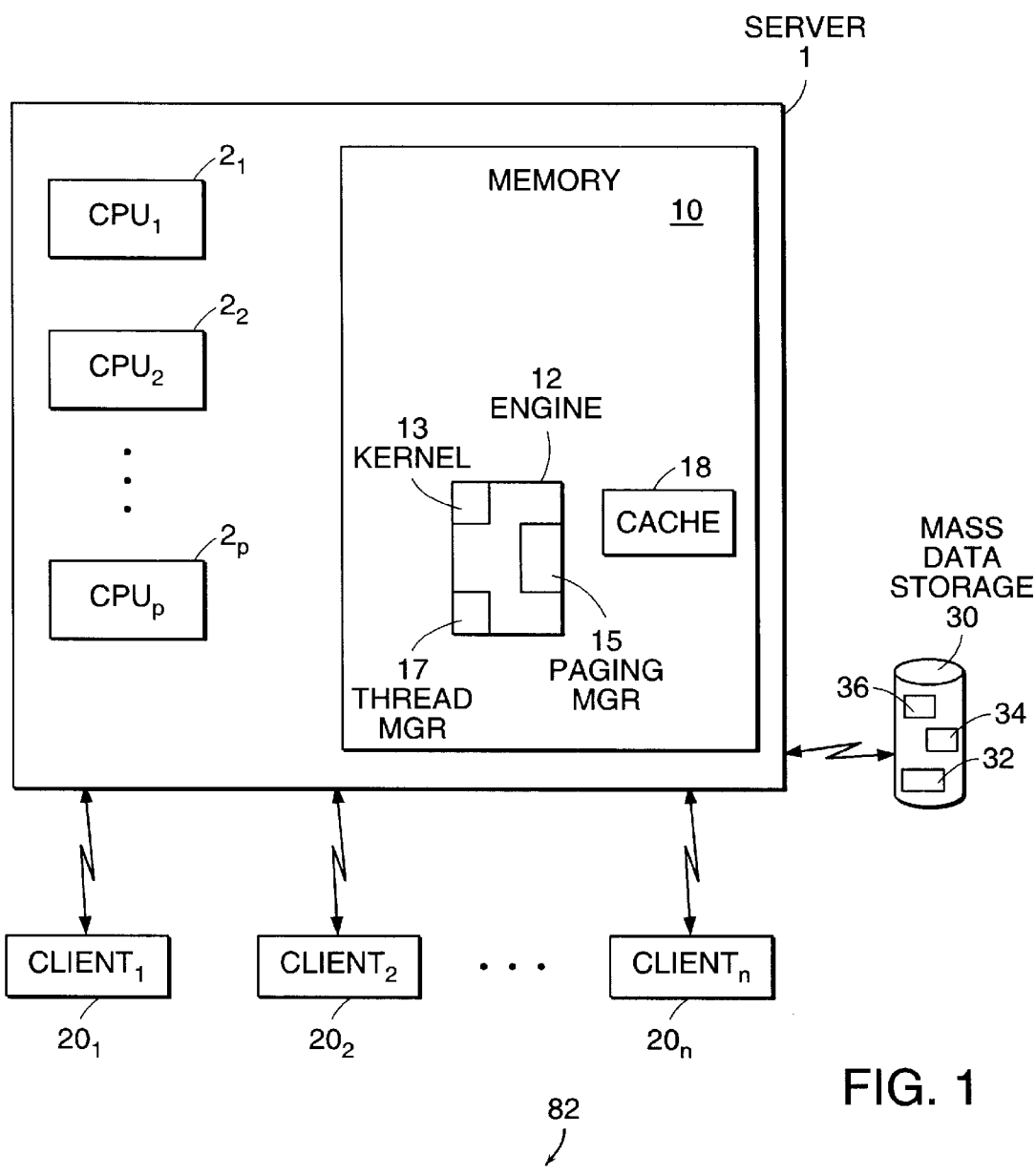
FIG. 1 is a schematic block diagram of an on-line analytical processing system embodying the invention.

FIG. 1 is a schematic block diagram of an on-line analytic processing (OLAP) system embodying the invention. A server 1 responds to requests from a plurality of client users $20_1, 20_2, \ldots, 20_n$. To satisfy client requests, the server 1 retrieves data from a data storage warehouse 30, which can include various databases, such as relational databases 32, multi-dimensional databases 34 and temporary databases 36 stored on disk.

The server 1 includes at least one central processing unit (CPU) $2_1, 2_2, \ldots, 2_p$. The CPUs 2 execute client or user sessions and system management processes to operate on data stored in memory 10, which includes an OLAP engine 12 and a cache memory 18. The OLAP engine 12 includes a kernel 13, a paging manager 15 and a thread manager 17. The user sessions preferably execute paging manager instructions, including page transfer functions 16, to manage pages in memory.

The user sessions and system management processes preferably include processing threads managed by the thread manager 17 in a multi-threaded OLAP engine 12. That is, user sessions can accomplish tasks by asynchronously executing processing threads. Embodiments of the invention preferably take the form of computer executable instructions embedded in a computer-readable format on a CD-ROM, floppy or hard disk, or another computer-readable distribution medium. These instructions are executed by one or more CPUs $2_1, 2_2, \ldots, 2_p$ to implement the OLAP engine 12. A particular embodiment of the invention is commercially available as Oracle Express Server, version 6.0, from Oracle Corporation.

FIG. 2 is a schematic block diagram of a preferred page management system. The paging manager 15 receives page requests from the client users $20_1, 20_2, \ldots, 20_n$ and insures that current pages are retrieved from disk 30 and stored in the shared cache memory 18. The cache memory 18 can be global memory or memory assigned to the OLAP application by the server operating system.

The paging manager 15 includes a private memory section $40_P$ and a public memory section $40_G$. The private section $40_P$ can include a plurality of private workspaces $41_1, 41_2, \ldots, 41_n$. There is one private workspace 41 for each user session. A private workspace 41 includes private pagespace views $50a, 50b, \ldots, 50z$, which record information about writable pagespaces referenced by the current user session.

The public section $40_G$ is organized based on open databases. For ease of understanding, the system is illustrated as having one open database. However, it should be understood that there are generally a plurality of open databases being accessed by the client users. For each open database there is a public workspace 45 in the public memory section $40_G$ having, in general, a plurality of generational pagespace views $60a, 60b, \ldots, 60g$. Each private pagespace view 50 is associated with a particular generation of the database. For ease of description, preferred embodiments of the invention will be described with reference to a single database having a single generation in memory.

The cache memory 18 includes page buffers $84_1, 84_2, \ldots, 84_X$ each having an associated page control block (PCB) $82_1, 82_2, \ldots, 82_X$. Each page buffer 84 holds page of data read from storage 30. In accordance with a preferred embodiment of the invention, the page buffers 84 each store data in blocks of 4K bytes, defined as a page. It should be understood that the page size can be chosen to be either less than or greater than 4K bytes. The page control blocks 82 include data fields used to control and access associated page buffers 84. The cache memory 18 is shared by the user sessions to store both public and private data.

It is important to note that there is no physical division between public and private data pages. That is, a particular page buffer 84 simply stores a page of data, which can be either public or private data. It is up to the OLAP engine 12 to logically separate public and private data pages. In particular, the OLAP engine 12 relies on the public workspace 45 and the private workspaces $41_1, \ldots, 41_n$, which include indexes to the appropriate page control blocks $82_1, \ldots, 82_x$.

Figure 3B:
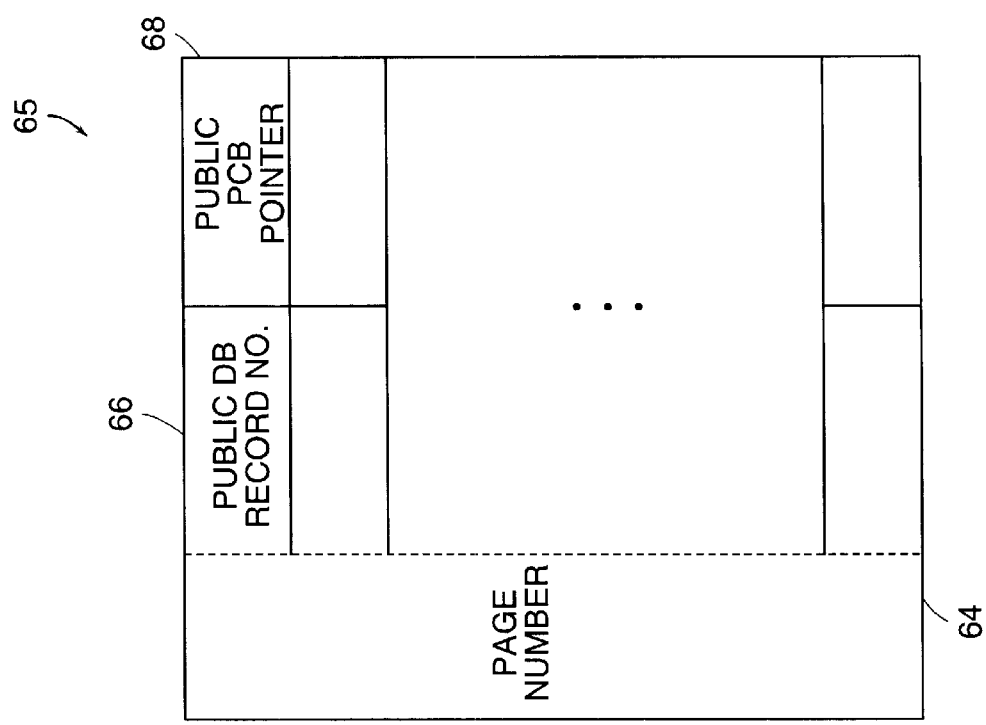
FIGS. 3A–3B are schematic block diagrams of a private workspace and a global workspace index structure, respectively.
Figure 3A:
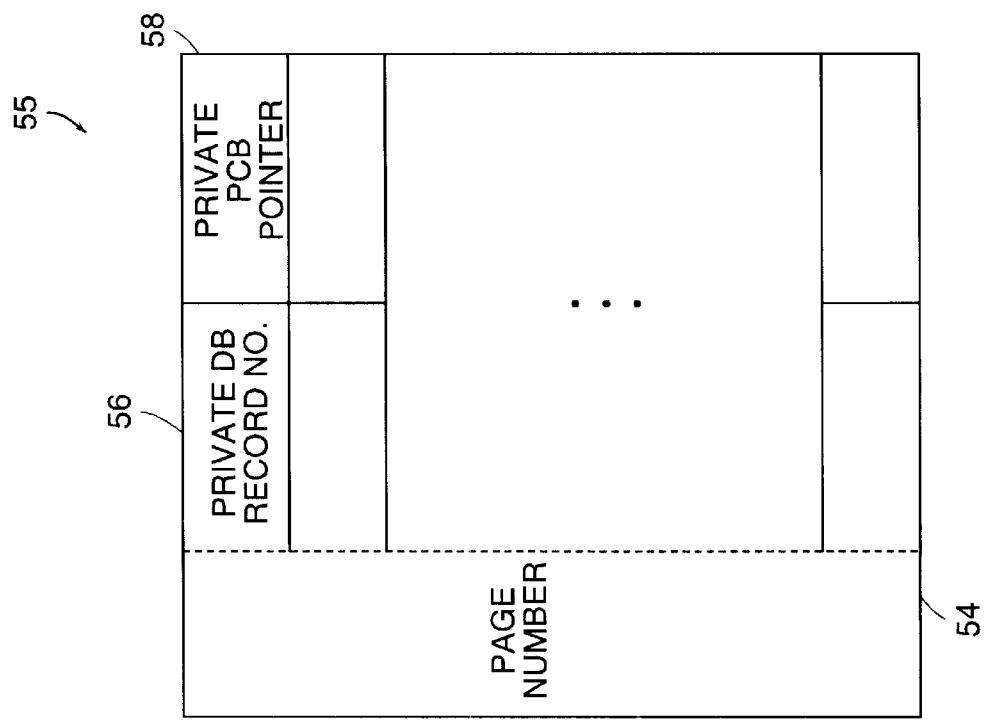

FIGS. 3A–3B are schematic block diagrams of a private workspace index structure 55 and a public workspace index structure 65, respectively. The index structures 55, 65 are included within a pagespace handle and are indexed by a page number 54, 64 within the associated pagespace. There is preferably one private index structure 55 stored in session memory for each pagespace per session. Similarly, there is one public index structure 65 for each open and sharable pagespace. In a particular preferred embodiment, the index structures 55, 65 are a B-tree, but other look-up structures can be substituted to meet particular objectives.

From the index structures 55, 65, a database record number 56, 66 and a page control block pointer 58, 68 are available if the page is within the respective view. If not null, the database record number 56, 66 identifies the record number in the database which holds the requested page. If the page is stored in the cache 18, the page control block pointer 58, 68 points to the page control block 82 associated with the page buffer 84 in which the referenced record is stored.

Figure 4:
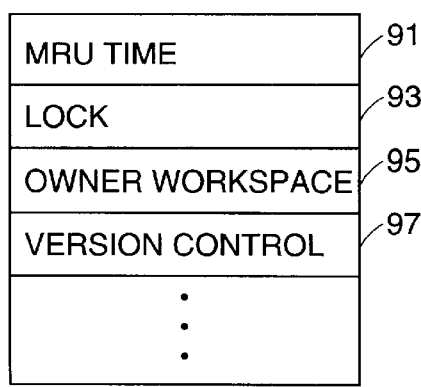
FIG. 4 is a schematic block diagram of a page control block.

FIG. 4 is a schematic block diagram of a page control block structure. Each page control block 82 includes a most-recently-used (MRU) time field 91, a lock flag 93, an owner workspace pointer 95, and a version control field 97. The page control block 82 also includes additional fields used by other components of the computer paging subsystem and which are not shown.

A user session uses the above architecture by executing paging manager code. For data to be processed by a session, the data must be retrieved from mass storage 30 and stored in a page buffer 84 in the cache 18. Once the data is retrieved, the page buffer 84 can be publicly accessed by any user session. If the data is to be modified, such as for a what-if analysis, then the data is copied to a private page buffer, leaving the original data in the public page buffer. Details of fetching data into the cache 18 will now be described in detail.

Figure 5A:
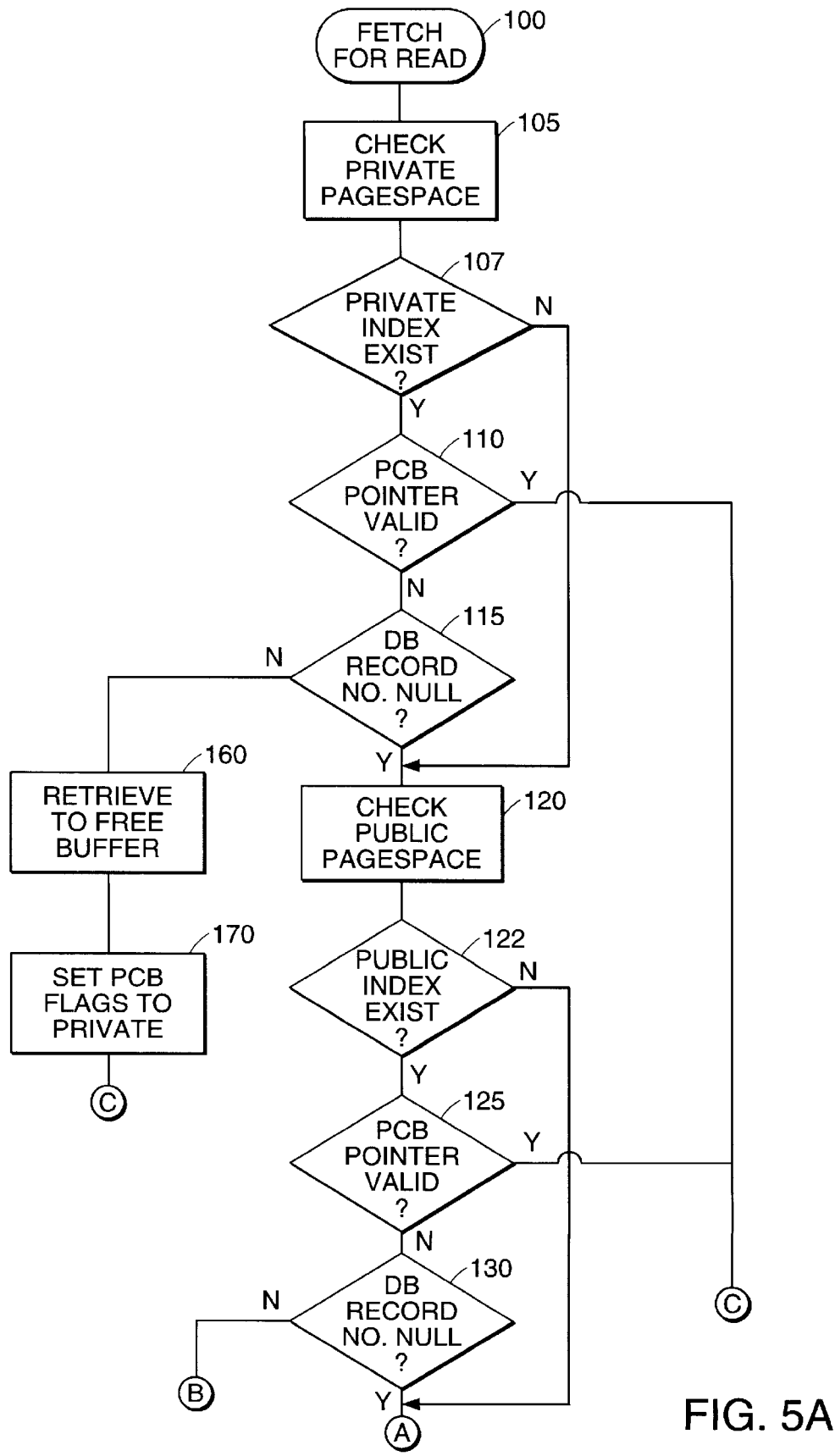
FIGS. 5A–5B illustrate a flow chart of a fetch for read operation in accordance with a preferred embodiment of the invention.
Figure 5B:
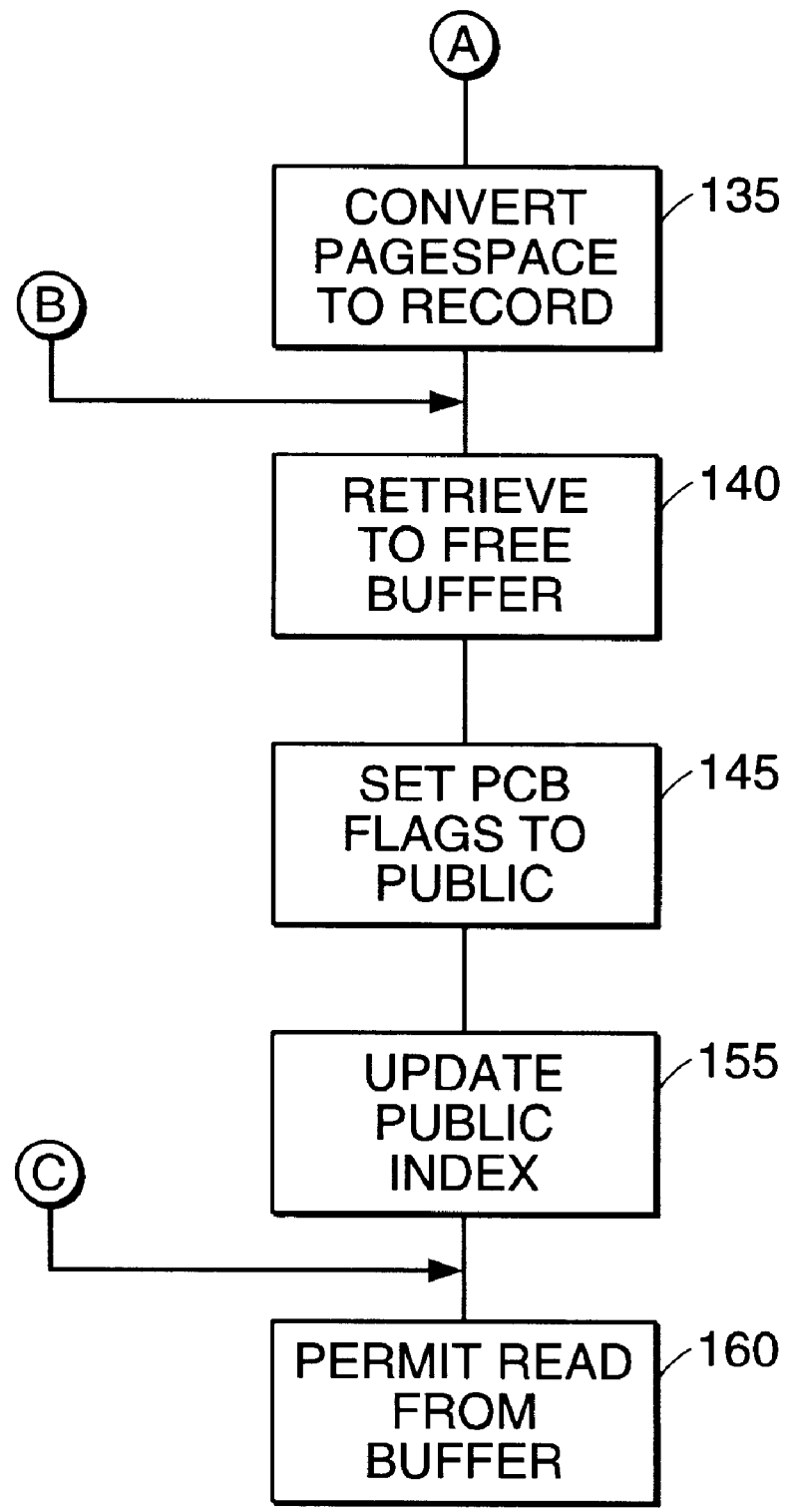

FIGS. 5A–5B illustrate a flow chart of a fetch for read operation 100 in accordance with a preferred embodiment of the invention. For a read operation, a user session thread passes, through a page transfer function 16 (FIG. 1), a pagespace handle and a page number along with a read access privilege mask. At step 105, the function attempts to check the private view for the referenced pagespace. At step 107, if a private index structure 55 does not exist for this pagespace, processing jumps to step 120 to search the global view. Otherwise, the pagespace is in the private view and processing continues to step 110.

At step 110, the private page control block pointer 58 is tested. If the private pointer 58 is valid (e.g., not null), then the page is stored in a buffer in cache memory and processing jumps to step 180. If the private pointer 58 is invalid (e.g., null), then the page is not in the cache memory 18 and processing continues to step 115.

At step 115, the private record number field 56 is compared against null. If the private record number field 56 is null, then the user does not have access to the page. If the private record number field 56 is not null, then the user session has private access to the page, but it has been written from the cache to the database 32, 34 (or a temporary database 36) on disk 30.

Where the user session does not have private access to the page (steps 107, 115), the operation checks the public view for the pagespace at step 120. At step 122, if a public index structure 65 does not exist for this pagespace, then processing jumps to step 135 to search for the database record. Otherwise, the pagespace is in the public view and processing continues to step 125.

At step 125, the public page control block pointer 68 is tested. If the public pointer 68 is valid (e.g., not null), then the page is in memory and processing jumps to step 180. If the public pointer 68 is invalid (e.g., null), then the record is not currently in cache memory and processing continues to step 130.

At step 130, the public record number field 66 is tested against null. If the public record number field 66 is null, then the page has not been loaded into memory and processing continues to step 135, where the pagespace is converted to a database record using a record map on disk for the particular database. On the other hand, if the public record number 66 is not null, then the database record is known to the paging manager. Processing now continues to step 140.

At step 140, the data is retrieved from disk to a free page buffer taken from a free buffer list (described in detail below). At step 145, the associated page control block fields are set to indicate public ownership. In particular, the owner workspace field 95 is set to null. At step 155, the public index structure 65 is updated to record the public database record number 66 and the public page control block pointer 68 is set to point to the page control block 82. Processing then continues to step 180.

Returning to step 160, because the database record had already been retrieved from storage into a private workspace, it was written to the disk 30. The private database record number field 56 identifies the location of the data on the disk, either in the database 32, 34 or in a temporary database 36. At step 160, the page is retrieved from disk storage and placed into a free page buffer from the free buffer list (described in detail below). At step 170, the page control block fields are set to indicate private ownership by setting the owner field 95 to identify the owner workspace. Processing then continues to step 180.

At step 180, the user session can locate the data in a privately accessible page buffer 82. The data is now available to be read by the user session. Initially, a fetch for write operation is similar to the fetch for read operation. In a fetch for write operation, however, the read page is copied to another, private, page buffer.

Figure 6A:
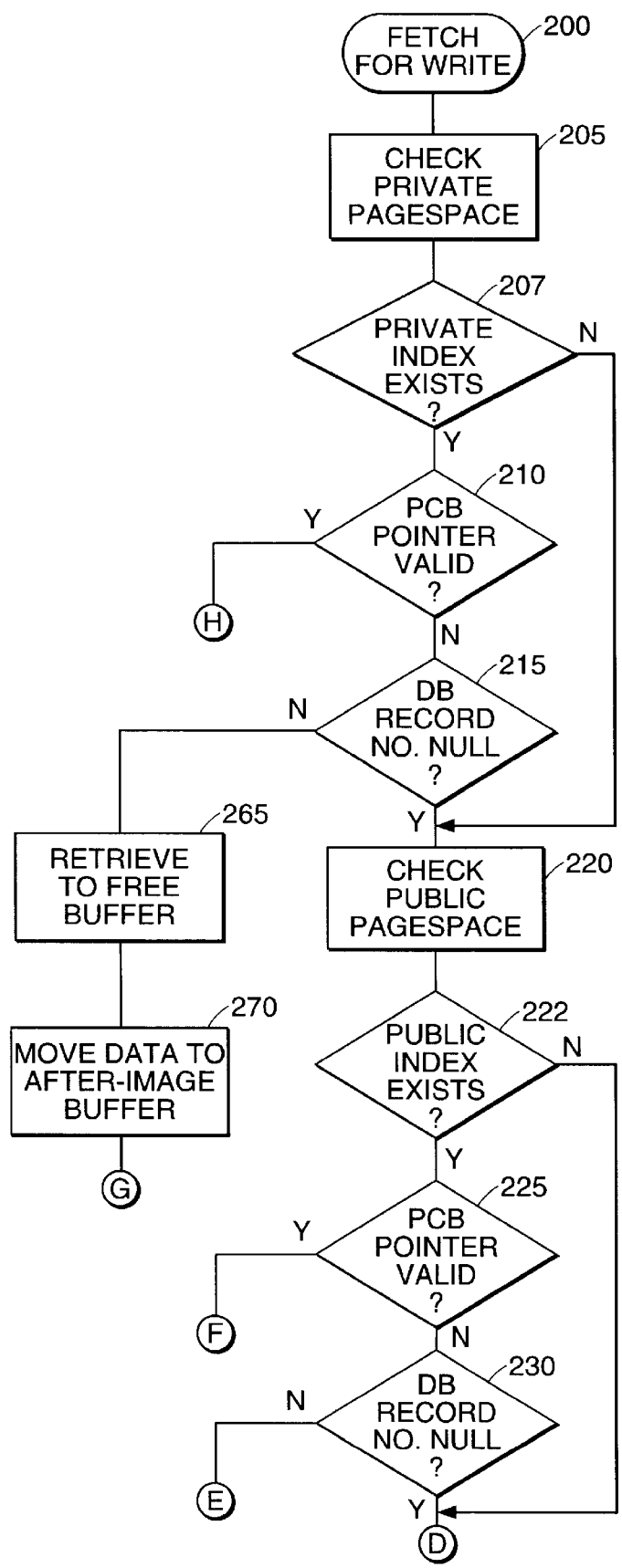
FIGS. 6A–6B illustrate a flow chart of a fetch for write operation in accordance with a preferred embodiment of the invention.
Figure 6B:
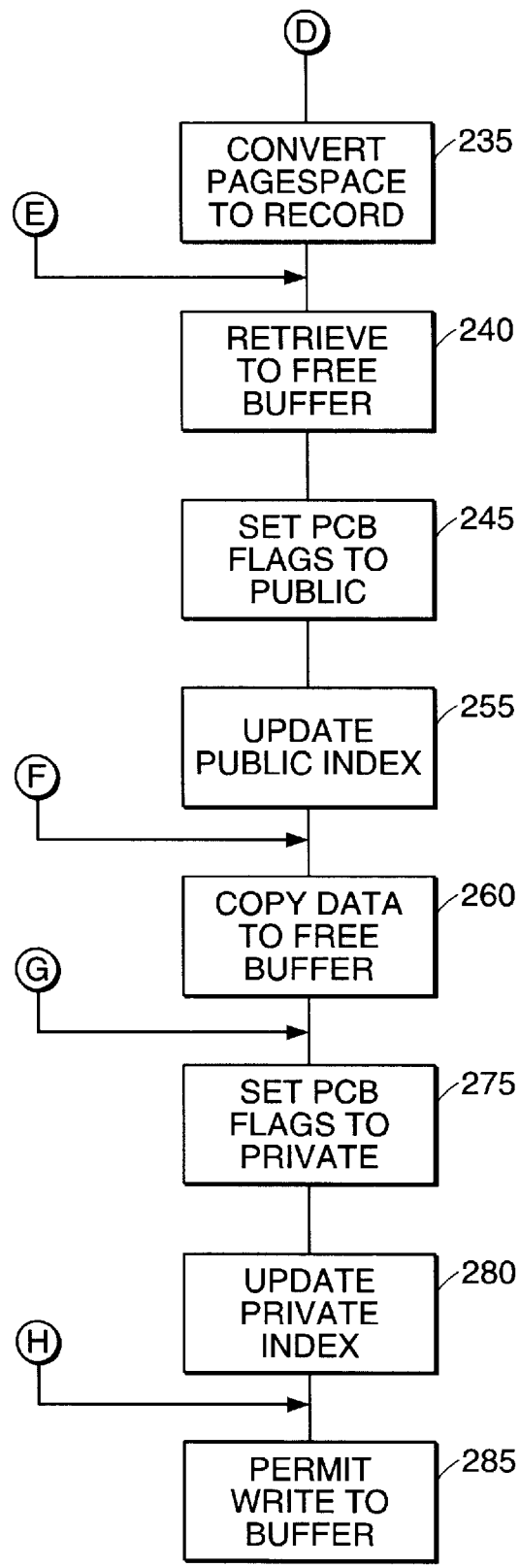

FIGS. 6A–6B illustrate a flow chart of a fetch for write operation 200 in accordance with a preferred embodiment of the invention. At step 205, the write operation 200 checks the private view for the requested pagespace. At step 207, if a private index structure 55 does not exist for this pagespace, processing jumps to step 220 to search the global view. Otherwise, the pagespace is already in the private view and processing continues to step 210.

At step 210, the private page control block pointer 58 is checked. If the private pointer 58 is valid (e.g, not null), then the page having the record has already been loaded into the cache memory 18 and is available for write access. In that case, processing jumps to step 285. On the other hand, if the private pointer 58 is invalid (e.g., null), then the page does not currently exist in the private cache memory 18 and processing continues to step 215.

At step 215, the database record number 56 is compared against null. If the record number 56 is null, then the requested page has not been loaded into memory for write access in the private view and processing continues to step 220. If the record number 56 is not null, then the page has previously been read into the cache and temporarily stored in the database 32, 34 or a temporary database 36 on disk. In that case, processing jumps to step 265.

At step 220, the public view is checked for the pagespace. At step 222, if a public index structure 65 does not exist for this pagespace, the processing jumps to step 235 to search for the database record. Otherwise, the pagespace is in the public view and processing continues to step 225.

At step 225, the public page control block pointer 68 is checked. If the public pointer 68 is valid (e.g., not null), then the page currently exists in the cache memory 18 and processing jumps to step 260. If the public pointer 68 is invalid (e.g., null), then the record is not available in the cache 18 for public access and processing continues to step 230.

At step 230, the public database record number 66 is compared against null. If the public record number field 66 is null, then the record has not previously been loaded into the cache memory 18 and processing continues to step 235 where the pagespace is converted to a database record. If the record number 66 is not null, then the data can be accessed using the stored record number and processing jumps to step 240.

At step 240, the page is retrieved from disk into a free page buffer (described in detail below). At step 245, the page control block fields are set to indicate public access. In particular, the owner workspace field 95 is set to null. At step 255, the public index data fields 66, 68 are updated to identify and point to the public page control block.

At step 260, the data from the public page buffer is copied to another free page buffer. At step 275, the page control block fields are set to indicate private ownership as described above. At step 280, the private index fields 56, 58 for the user process is updated to identify and point to this private page control block.

At step 285, the page buffer is available for write access to the user process. The user process can now continue the write operation to the privately accessible cache buffer.

As discussed above, pages retrieved from disk 30 are stored into a free page buffer 84. To facilitate this function, the paging manager maintains a list of all free page buffers 84. For example, a free list pointer can point to a linked list of page control blocks 82 associated with free page buffers 84. When the paging manager needs a free buffer, the first page control block on the free list is popped from the top of the linked list, moving the free list pointer to the next page control block in the linked list.

In accordance with a preferred embodiment of the invention, the user sessions do not directly maintain the cache memory area. Because of the particular use of pagespaces and pointers to denote page ownership, a user session requiring a new page may deadlock with another user session. In such a situation, each user session can be referencing a page which the other user session has chosen to swap from memory. To avoid such a deadlock, a separate dedicated collector thread is utilized to manage page removal from the cache memory area.

In a multi-threaded environment, user sessions can also be multi-tasked into a plurality of processing threads. In an active system, processing threads can become active in bursts, causing high page fault rates. This situation can be particularly troublesome in an OLAP system where processing threads can operate on a large amount of page data from large multi-dimensional databases. In typical prior art systems, data is either stored locally within a user process space or global page buffers are freed to satisfy the page requests. This process of freeing a global page buffer on demand before data can be retrieved from disk delays the user sessions.

To minimize processing delays which can occur when the free list becomes empty, the paging manager 15 maintains a counter of the number of entries on the free list. Every time a page control block is removed from the free list, the count in compared with a minimum threshold value. If the minimum threshold is met, then the paging manager begins a collecting operation to free up additional page buffers. The minimum threshold value is chosen based on a historical operational profile of the system to maximize the number of page buffers 84 in use while reducing the chances that there are no free page buffers at any time. For example, the minimum threshold value can be initially chosen to be 10% of the total page buffers. The minimum threshold can also be dynamically adjusted by the paging manager over time.

Figure 7A:
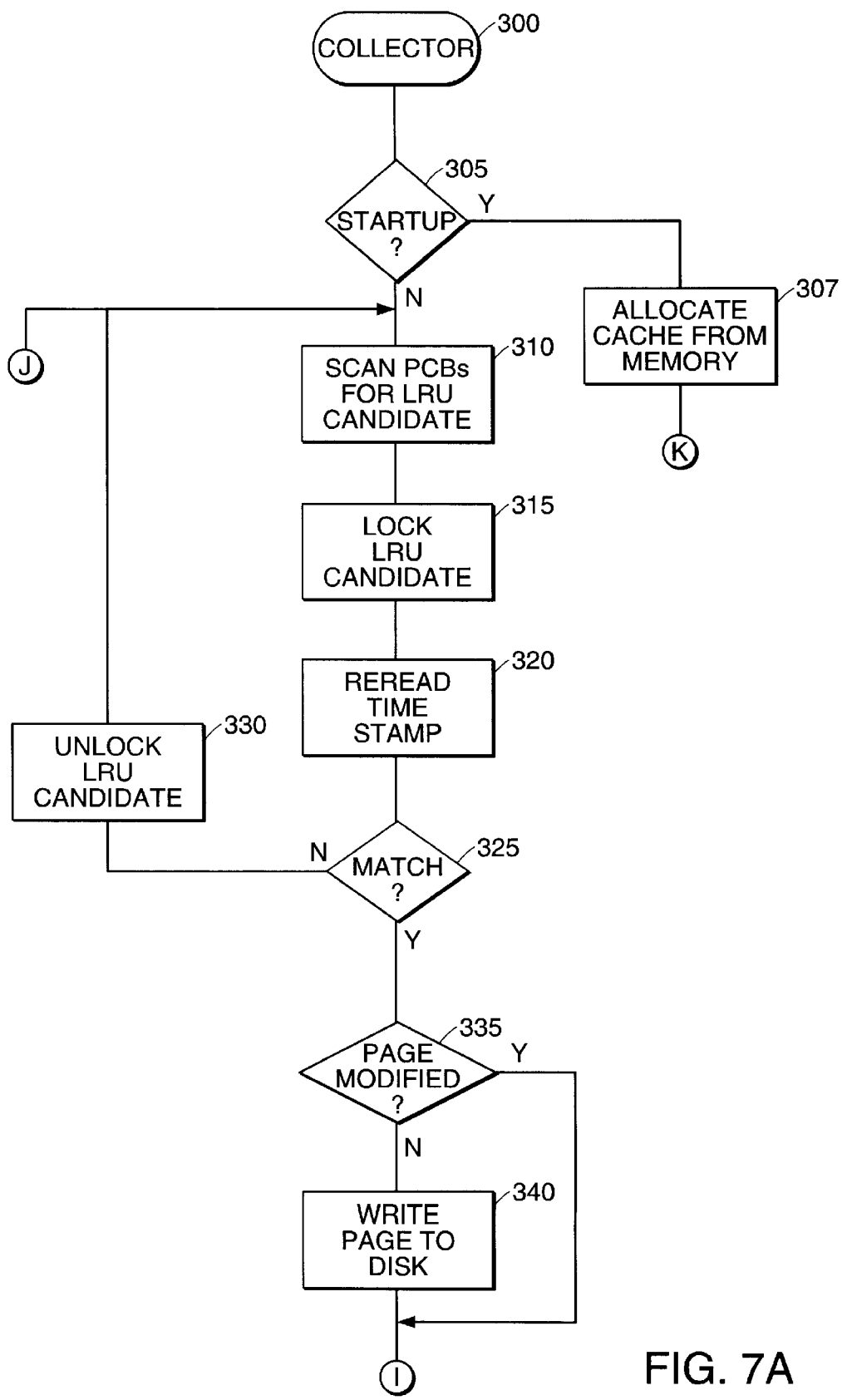
FIGS. 7A–7B illustrate a flow chart of a collector operation in accordance with a preferred embodiment of the invention.
Figure 7B:
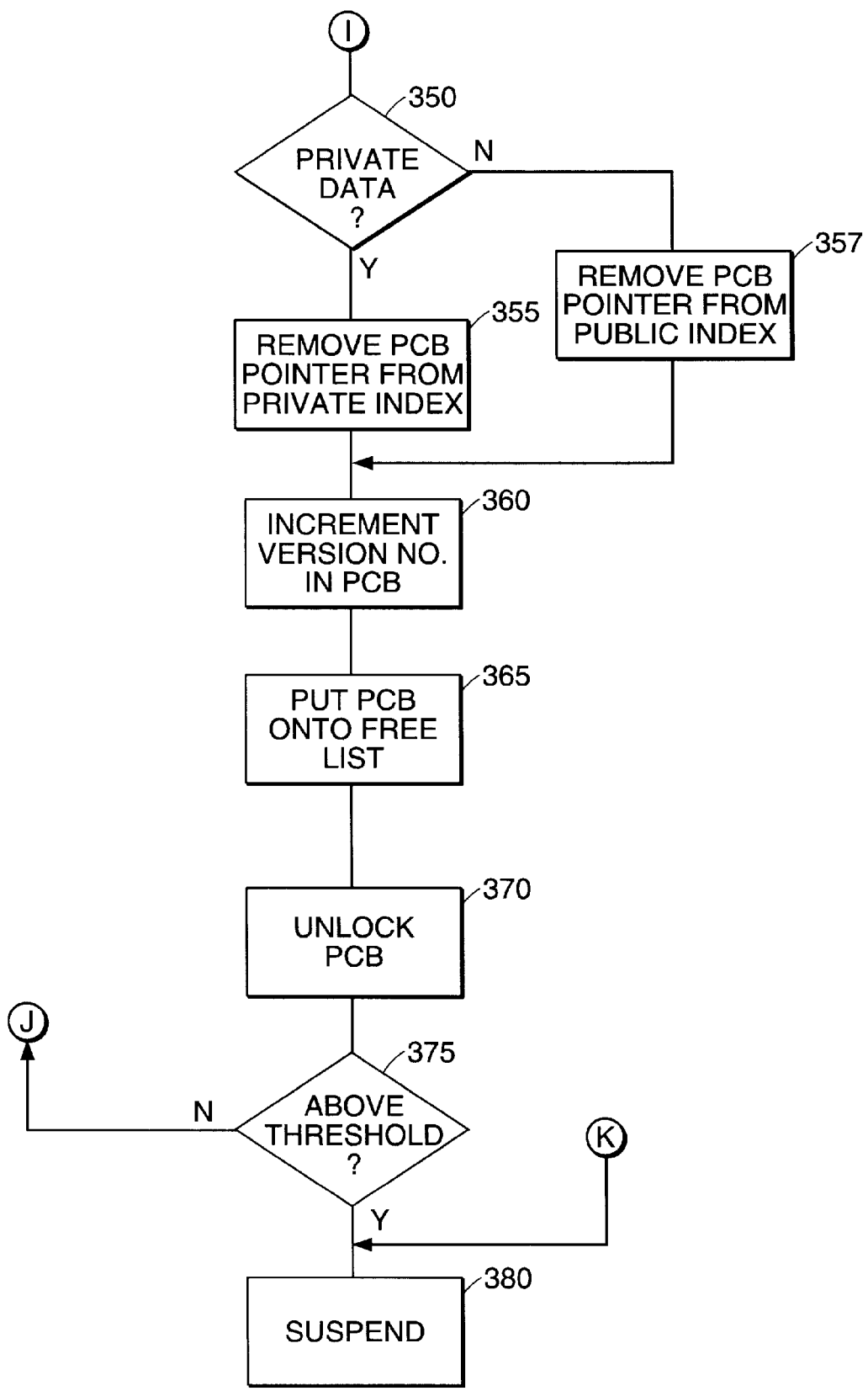

FIG. 7A–7B illustrate a flow chart of a collecting operation 300 in accordance with the preferred embodiment of the invention. Preferably, the collector operation 300 is performed by a specialized thread in a multi-threaded environment to reduce contention and deadlock between user sessions. At step 305, the operation checks the startup condition. If a startup condition exists, then processing continues to step 307 where the collector allocates cache memory from main memory. Processing then jumps to step 380.

If this is not a startup condition, processing continues to step 310. At step 310, the collector scans the page control blocks for the least-recently-used (LRU) candidate. In particular, the collector reads the MRU time field 91 from each page control block $82_1, 82_2, \ldots, 82_X$. The page control block having the earliest MRU time, is the LRU candidate. At step 315, the collector locks the LRU candidate, thereby setting the lock field 93 in the page control block 82. At step 320, the collector rereads the MRU time field from the LRU candidate page control block. At step 325, the collector compares the original time value with the reread time value to verify that the page has not been more recently used.

If the compared time values do not match, then processing continues to step 330. At step 330, the collector unlocks the LRU candidate page control block and processing returns to step 310 to try again.

If the time values agree (step 325), then the page is confirmed as the least-recently-used page and processing continues to step 335. At step 335, the owner field 95 of the page control block 82 is checked. If the owner field 95 is set, then the page is private data to the user session identified by the owner field 95 and processing continues to step 340. At step 340, the collector causes the page buffer to be written to disk, such as an extended database 36. In particular, if an extension file needs to be created, the collector sends a message to the owner user session to do the file creation.

Once the extension file exists, the collector writes to it itself. Processing then continues to step 350. If the data has not been modified (as indicated by a null (i.e., public) owner field 95), then the data is public data for read-only access. In that case, processing jumps to step 350 without rewriting the data to disk.

At step 350, a check of the owner field 95 is again made to gee if the field is not null (i.e., private data). If the page is private, processing continues to step 355, where the page control block pointer is removed from the private index structure 55 by setting the private pointer 58 to null. If the page is public, processing instead continues to step 357 where the page control block pointer is removed from the public index structure 65 by setting the public pointer 68 to null.

At step 360, the version number 93 of the page in the page control block 82 is incremented. At step 365, the page control block is put onto a free list of available page control blocks. At step 370 the page control block is unlocked to make it available for re-use.

At step 375, the collector tests the number of page control blocks on the free list. If this number is above a preset maximum threshold, then processing continues to step 380. If the maximum threshold has not yet been reached, processing returns to step 310 to search for additional page control blocks to add to the free list. The maximum threshold value is preferably chosen to optimize the cache memory 18 based on past performances. For example, the maximum threshold can initially be twice the minimum threshold and can be dynamically adjusted by the paging manager.

At step 380, the collector thread suspends itself. It is awakened again when the number of page control blocks on the free list is reduced to be below the previously-described minimum threshold level. The collector is preferably awakened by a write or read operation from a user session when a page buffer is taken from the free list (FIGS. 5A–5B (140, 160)); FIGS. 6A–6B (240, 260, 265)).

Although the collector has been described as employing an LRU algorithm, other algorithms may be more particularly suitable. For example, in systems having large caches, the computations required to determine the LRU candidate can be very time consuming. It should be recognized, however, that the function of the collector is to maintain a buffer of free page slots, even during heavy page faulting, without blocking user threads. To accomplish this function, it is recognized that the candidate page slot does not have to be storing the LRU page.

In accordance with another preferred embodiment, an "old enough" algorithm is employed to find a reclamation candidate that has not been recently used. Instead of the MRU time field 91, the collector preferably reads an internal counter field in the page control block, which can be faster to retrieve than a time field. By, for example, knowing the oldest counter value, the collector can determine a threshold counter value for those pages that are old enough to be reclaimed. Instead of looping through the entire page pool for the single LRU candidate, the collector can stop the search when finding the first page having a counter which exceeds the threshold; with the realization that this page is likely to be eventually reclaimed under the LRU algorithm anyway. By using such an "old enough" algorithm, the amount of CPU time required by the collector can be reduced to a few percent of that required for the LRU algorithm.

In an OLAP system, most data retrieved from storage is read-only data, which is easier to remove from the cache memory than modified data. Any session, however, can cause data in the cache memory to be privately modified. This data may only be used for a relatively brief period of time, but may tend to stay in the cache memory, using the server's page buffers for a private function. Although that situation is acceptable for short time periods, if left unattended much of the cache memory blocks can be allocated as private memory. In accordance with another aspect of the invention, modified pages are flushed to temporary storage when not in use. According to protocol, a page is guaranteed to be in a page buffer only if locked by a process thread. Any unlocked page is free to be flushed.

Figure 8:
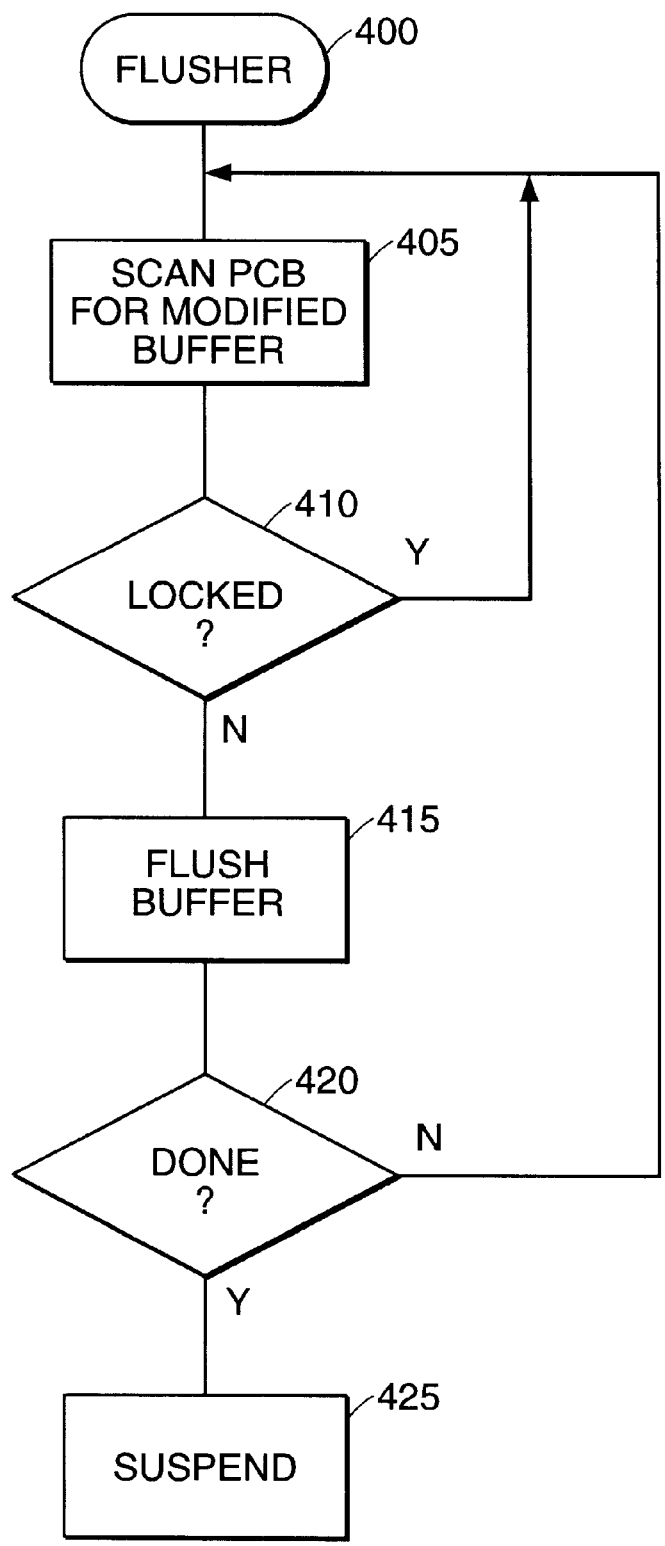
FIG. 8 illustrates a flow chart of a flusher operation in accordance with a preferred embodiment of the invention.

FIG. 8 illustrates a flow chart of a flusher operation 400 in accordance with the preferred embodiment of the invention. The flusher operation 400 is preferably performed by an independent flusher thread. Preferably, the flusher thread is activated by a periodic timer event. For example, the flusher thread can be run every 30 seconds to flush modified and unlocked pages to temporary storage from the cache memory area. In accordance with a preferred embodiment of the invention, the flusher thread is executed on one processor in a multi-processor server.

At step 405, the flusher scans the page control blocks for a modified buffer as indicated by having a set owner field 95. At step 410, the lock bit 93 of the modified buffer is checked. If the buffer is locked, processing returns to step 405 to find the next modified buffer.

If the buffer is not locked, the buffer is flushed at step 415. At step 420, the flusher checks to see if it has searched the entire cache memory area. If so, the flusher is finished and suspends itself at step 425. If the flushing task has not yet finished, processing returns to step 405.

EQUIVALENTS

While the invention has been particularly shown and described with reference to preferred embodiments thereof, it will be understood to those skilled in the art that various changes in form and detail can be made without departing from the spirit and scope of the invention as defined by the appended claims. For example, although the invention has been described with reference to particular hardware and software embodiments, it will be understood that various aspects of the invention can be embodied in either hardware, software or firmware.

These and all other equivalents are intended to be encompassed by the following claims.

The invention claimed is:

1. An apparatus for simultaneously analyzing data stored in a common system memory by multiple data accessors in a computer comprising:

public blocks of a shared memory space, the public blocks storing data retrieved from storage therein for global read-only access by a plurality of user accessors;

private blocks of the shared memory space, each private block storing data therein for private read and write access by a single user accessor, the stored data including data selectively copied from public blocks of data;

a read operation to provide read access to a data item by a user accessor, the read operation reading the data item if present from a private block accessible by the user accessor, and if the data item is not present on a private block accessible from the user accessor, reading the data item from a public block; and a write operation to provide write access to the data item by the user accessor, the write operation writing the data item to a private block so that a modification to the data item is not communicated to the other user accessors wherein the first and second accessors select each memory block from a list of free memory blocks; and a flusher executing in the computer, the flusher maintaining the list of free memory blocks by freeing unused allocated memory blocks in response to a triggering event.

2. The apparatus of claim 1 wherein the data stored in the first memory block is a specific generation of the data from a database.

3. The apparatus of claim 1 further comprising a collector executing in the computer, the collector maintaining the list of free memory blocks freeing allocated memory blocks in response to a triggering event wherein the triggering event occurs when the number of free memory blocks falls below a threshold.

4. The apparatus of claim 1 wherein the triggering event is a periodic timer.

5. The apparatus of claim 1 wherein the user accessors are computing threads in a multi-threaded computer system.

6. The apparatus of claim 1 wherein the shared memory space is a page cache.

7. The apparatus of claim 1 wherein the private block comprises data copied from a public block to the private block.

8. The apparatus of claim 1 wherein each block of data is associated with a generation of data from a database.

9. The apparatus of claim 1 further comprising a set of public pointers accessible to the user accessor, wherein each public pointer is assigned to a respective public block.

10. The apparatus of claim 1 further comprising a user process with a set of private pointers only accessible to the user accessor, wherein each private pointer is assigned to a respective private block of the user accessor.

11. The apparatus as claimed in claim 1 wherein the user accessors read the read-only public blocks without having exclusive access to the read-only public block.

12. An apparatus for managing a common system memory for a plurality of data accessors in a computer comprising:

a plurality of memory blocks in the memory, a first memory block and a second memory block having data stored therein;

a first data accessor executing in the memory, the first data accessor having a non-modifiable global view of the first memory block data;

a second data accessor executing in the memory, the second data accessor having a non-modifiable global view of the first memory block data and a modifiable private view of the second memory block data, if the data is to be modified by the second data accessor, so that a modification to the second memory block data by the second data accessor is not communicated to the first data accessor wherein the first and second accessors select each memory block from a list of free memory blocks; and a flusher executing in the computer, the flusher maintaining the list of free memory blocks by freeing unused allocated memory blocks in response to a triggering event.

13. The apparatus of claim 12 further comprising a collector executing in the computer, the collector maintaining the list of free memory blocks by freeing allocated memory blocks in response to a triggering event wherein the triggering event occurs when the number of free memory blocks falls below a threshold.

14. The apparatus of claim 12 wherein the triggering event is a periodic timer.

15. The apparatus of claim 12 wherein the first and second accessors are user processing threads in a multi-threaded computer system.

16. The apparatus of claim 12 wherein the plurality of memory blocks comprises a cache memory area.

17. The apparatus of claim 12 wherein the second memory block has data copied from the first memory block.

18. The apparatus of claim 12 further comprising a pointer accessible by the first and second accessors which references the first memory block.

19. The apparatus of claim 12 wherein the second accessor has exclusive write access to the second memory block.

20. The apparatus of claim 19 further comprising a private pointer accessible only by the second process which references the second memory block.

21. The apparatus claim 12 wherein the data stored in the first memory block is a specific generation of the data retrieved from a database.

22. A method of managing memory for a plurality of data accessors in a computer having a plurality of memory blocks in a common system memory, comprising:

storing data in a first memory block;

assigning a non-modifiable global view of the first memory block data to a first data accessor and a second data accessor in the computer;

copying the data from the first memory block to a second memory block if the data is to be modified by the second data accessor without regard to the existence of the data in any other memory block;

assigning a modifiable private view of the second memory block data to the second data accessor in the computer so that a modification to the second memory block data by the second data accessor is not communicated to the first data accessor;

selecting each memory block from a list of free memory blocks; and maintaining the list of free memory blocks by triggering a flusher to free unused allocated memory blocks in response to a triggering event.

23. The method of claim 22 further comprising maintaining the list of free memory blocks by triggering a collector to free allocated memory blocks in response to a triggering event wherein the triggering event occurs when the number of free memory blocks falls below a threshold.

24. The method of claim 22 wherein the triggering event is a periodic timer.

25. The method of claim 22 wherein the first and second data accessors are user process threads in a multi-threaded computer system.

26. The method of claim 22 wherein the memory blocks are a cache memory area.

27. The method of claim 22 further comprising associating a pointer accessible by the first and second data accessors to the first memory block.

28. The method of claim 22 wherein the second data accessor includes exclusive write access to the second memory block.

29. The method of claim 28 further comprising associating a private pointer accessible only by the second data accessor to the second memory block.

30. The method of claim 22 wherein the first data accessor and the second data accessor read the first memory block without having exclusive access to the first memory block.

31. The method of claim 22 wherein storing comprises retrieving a specific generation of the data from a database.

32. A method of simultaneously analyzing data stored in a common system memory by multiple data accessors in a computer, comprising:
retrieving data from storage into public blocks of a shared memory space, the public blocks storing data therein for global read-only access by a plurality of user accessors;
selectively copying public blocks of data into private blocks of the shared memory space, each private block storing data therein for private read and write access by a single user accessor without regard to the existence of the data by any other memory block;
upon read access to a data item by a user accsessor, reading the data item if present from a private block accessible by the user accessor, and if the data item is not present on a private block accessible by the user accessor, reading the data item from a public block;
upon write access to the data item by the user accessor, writing the data item to a private block without communicating any modification to another user accessor;
selecting each memory block from a list of free memory blocks; and
maintaining the list of free memory blocks by triggering a flusher to free unused allocated memory blocks in response to a triggering event.

33. The method of claim 32 further comprising maintaining the list of free memory blocks by triggering a collector to free allocated memory blocks in response to a triggering event wherein the triggering event occurs when the number of free memory blocks falls below a threshold.

34. The method of claim 32 wherein the triggering event is a periodic timer.

35. The method of claim 32 wherein the user accessors are computing threads in a multi-threaded computer system.

36. The method of claim 32 wherein the shared memory space is a page cache.

37. The method of claim 32 wherein writing the data item to a private block comprises copying data from a public block to the private block.

38. The method of claim 32 further comprising associating each block of data with a generation of data from a database.

39. The method of claim 32 further comprising:
storing a set of public pointers accessible to the user accessor; and
assigning each public pointer to a respective public block.

40. The method of claim 32 further comprising:
in a user accessor, storing a set of private pointers only accessible to the user accessor; and
assigning each private pointer to a respective private block of the user accessor.

41. The method of claim 32 wherein the user accessors read the read-only public blocks without having exclusive access to the public blocks.

42. The method of claim 32 wherein storing comprises retrieving a specific generation of the data from a database.

43. An article of manufacture comprising:
a computer-readable medium;
a computer-implementable program stored in the computer-readable medium for execution by a computer, the program including:
storing data in a first memory block in a common system memory;
assigning a non-modifiable global view of the first memory block data to a first data accessor and a second data accessor in the computer;
copying the data from the first memory block to a second memory block in the common system memory if the data is to be modified by the second data accessor, without regard to the existence of the data in any other memory block;
assigning a modifiable private view of the second memory block data to the second data accessor in the computer so that a modification to the second memory block data by the second data accessor is not communicated to the first data accessor;
selecting each memory block from a list of free memory blocks; and
maintaining the list of free memory blocks by triggering a flusher to free unused allocated memory blocks in response to a triggering event.

44. The article of manufacture of claim 43 wherein storing comprises retrieving a specific generation of the data from a database.

45. The article of manufacture of claim 43 further comprising maintaining the list of free memory blocks by triggering a collector to free allocated memory blocks in response to a triggering event wherein the triggering event occurs when the number of free memory blocks falls below a threshold.

46. The article of manufacture of claim 43 wherein the triggering event is a periodic timer.

47. The article of claim 43 wherein the first and second data accessor are programmed as user threads in a multi-threaded computer system.

48. The article of claim 43 wherein the memory blocks are programmed as a cache memory area.

49. The article of claim 43 wherein the program further comprises reading the data stored in the first memory block from a multi-dimensional database.

50. The article of claim 43 wherein the program further comprises associating a pointer accessible by the first and second data accessors to the first memory block.

51. The article of claim 43 wherein the second data accessor is programmed to include exclusive write access to the second memory block.

52. The article of claim 51 wherein the program further comprises associating a private pointer accessible only by the second data accessor to the second memory block.

53. The article of claim 43 wherein the first data accessor and the second data accessor read the first memory block without having exclusive access to the first memory block.

54. An article of manufacture comprising:
a computer-readable medium;
a computer-implemented program in the computer-readable medium for execution by a computer for simultaneously analyzing data stored in a common system memory by multiple data accessors in a computer, the program comprising:
retrieving data from storage in to public blocks of a shared memory space, the public blocks storing data therein for global read-only access by a plurality of user accessors;
selectively copying public blocks of data into private blocks of the shared memory space, each private block storing data therein for private read and write access by a single user accessor without regard to the existence of the data in any other memory block;
upon read access to a data item by a user accessor, reading the data item if present from a private block accessible by the user accessor, and if the data item is not present to a private block accessible by the user accessor, reading the data item from a public block;

upon write access to a data item by the user accessor, writing the data item to a private block without communicating any modification to the data to another user accessor;

selecting each memory block from a list of free memory blocks; and maintaining the list of free memory blocks by triggering a flusher to free unused allocated memory blocks in response to a triggering event.

55. The article of manufacture of claim 54 wherein retrieving comprises retrieving a specific generation of the data from a database.

56. The article of manufacture of claim 54 further comprising maintaining the list of free memory blocks by triggering a collector to free allocated memory blocks in response to a triggering event wherein the triggering event occurs when the number of free memory blocks falls below a threshold.

57. The article of manufacture of claim 54 wherein the triggering event is a periodic timer.

58. The article of claim 54 wherein the user accessors are programmed as computing threads in a multi-threaded computer system.

59. The article of claim 54 wherein the shared memory space is programmed as a page cache.

60. The article of claim 54 wherein writing the data item to a private block comprises copying data from a public block to the private block.

61. The article of claim 54 wherein the program further comprises associating each block of data with a generation of data from a database.

62. The article of claim 54 wherein the program further comprises:

storing a set of public pointers accessible to the user accessors; and assigning each public pointer to a respective public block.

63. The article of claim 54 wherein the program further comprises:

in a user accessor, storing a set of private pointers only accessible to the user accessor; and assigning each private pointer to a respective private block of the user accessor.

64. The article of claim 54 wherein the user accessor reads the read-only public blocks without having exclusive access to the public blocks.

* * * * *